United States Patent
Jia et al.

(10) Patent No.: US 11,068,184 B2
(45) Date of Patent: Jul. 20, 2021

(54) METHOD, DEVICE, AND COMPUTER PROGRAM PRODUCT FOR MANAGING A STORAGE SYSTEM

(71) Applicant: EMC IP Holding Company LLC, Hopkinton, MA (US)

(72) Inventors: Ruiyong Jia, Beijing (CN); Lifeng Yang, Beijing (CN); Jian Gao, Beijing (CN); Xinlei Xu, Beijing (CN); Yousheng Liu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 102 days.

(21) Appl. No.: 16/507,359

(22) Filed: Jul. 10, 2019

(65) Prior Publication Data
US 2020/0026451 A1 Jan. 23, 2020

(30) Foreign Application Priority Data
Jul. 20, 2018 (CN) .......................... 201810802254.3

(51) Int. Cl.
*G06F 3/06* (2006.01)
*G06F 16/903* (2019.01)

(52) U.S. Cl.
CPC .......... *G06F 3/0644* (2013.01); *G06F 3/0604* (2013.01); *G06F 3/0683* (2013.01); *G06F 16/903* (2019.01)

(58) Field of Classification Search
CPC ..... G06F 3/0644; G06F 3/0604; G06F 3/0683
See application file for complete search history.

(56) References Cited

U.S. PATENT DOCUMENTS

| | | |
|---|---|---|
| 9,152,353 B1 | 10/2015 | Wang et al. |
| 9,280,469 B1 * | 3/2016 | Kuang ................ G06F 11/1076 |
| 9,286,007 B1 | 3/2016 | Bono |
| 9,881,016 B1 | 1/2018 | Bono et al. |
| 9,916,090 B1 * | 3/2018 | Can ....................... G06F 3/0685 |
| 9,933,945 B1 | 4/2018 | Mao et al. |
| 2013/0185480 A1 * | 7/2013 | Newell ................ G06F 12/023 711/103 |
| 2018/0143775 A1 * | 5/2018 | Ben-Hohn ............ G06F 3/0619 |

(Continued)

*Primary Examiner* — Ryan Bertram
(74) *Attorney, Agent, or Firm* — BainwoodHuang (57) ABSTRACT

Techniques for managing a storage system involve: determining a size of a data information indicating area in the storage system, the data information indicating area indicating content information related to a slice group including multiple slices, the slice group being the smallest data granularity for storage processor access associated with the storage system; determining a correspondence between the size of the data information indicating area and a size of the slice group; and determining, based on the size of the data information indicating area and the correspondence, the size of the slice group. Accordingly, bandwidth of a communication message interface which interconnects storage processors and is utilized heavily by system components can be saved. Additionally, cross-storage processor message communication for access to data information indicating area from input and output paths can be eliminated. Furthermore, communication message interface resource contention can be relieved, and overall system performance can be improved.

11 Claims, 4 Drawing Sheets

(56) References Cited

U.S. PATENT DOCUMENTS

| | | | | |
|---|---|---|---|---|
| 2018/0173425 A1* | 6/2018 | Feng | ............... | G06F 3/065 |
| 2018/0314427 A1* | 11/2018 | Dalmatov | ............ | G06F 3/0644 |
| 2019/0235782 A1* | 8/2019 | Yu | ............... | G06F 12/023 |
| 2020/0133848 A1* | 4/2020 | Xu | ............... | G06F 3/0608 |

\* cited by examiner

METHOD, DEVICE, AND COMPUTER PROGRAM PRODUCT FOR MANAGING A STORAGE SYSTEM

CROSS-REFERENCE TO RELATED APPLICATION

This application claims priority to Chinese Patent Application No. CN201810802254.3, on file at the China National Intellectual Property Administration (CNIPA), having a filing date of Jul. 20, 2018, and having "METHOD, APPARATUS, AND COMPUTE PROGRAM PRODUCT FOR MANAGING STORAGE SYSTEM" as a title, the contents and teachings of which are herein incorporated by reference in their entirety.

FIELD

Embodiments of the present disclosure generally relate to the field of data storage, and more specifically, to a method, device, and computer program product for managing a storage system.

BACKGROUND

A storage device array (also referred to as a storage system) may be used by multiple peer storage processors (SPs). While the storage system is running, zerofilling (ZeroFill) operations are involved. Zerofilling is an operation that writes zeros into a piece of continuous disk range. The operation usually takes place in a virtual logical unit component or a file system. For example, when adding or removing slices, a virtual logical unit slice manager often zeros them. In the meanwhile, the file system often zeroes some metadata (such as datalog descriptors). In order to improve the performance of zerofilling, a cache maintains a zerofilling bitmap (which may be referred to as data information indicating area in the present disclosure) per LUN and the storage backing the zerofilling bitmap is reserved by a Redundant Array of Independent Disks at the end of the traditional LUN.

In current storage system implementations, the zerofilling bitmap is managed and accessed at a very large granularity: the smallest lockable bitmap block covers as much as 0.5 TB LUN disk range. Since input and output (IO) requests can come into the cache from both SPs, IOs falling into a same bitmap block covering range will inevitably contend for the bitmap block and cause cross-SP message communication for zerofilling bitmap synchronization, which will degrade the system performance.

SUMMARY

Embodiments of the present disclosure provide a method, a device, and a computer program product for managing a storage system.

In a first aspect of the present disclosure, provided is a method for managing a storage system. The method includes: determining a size of a data information indicating area in the storage system, the data information indicating area indicating content information related to a slice group including multiple slices, the slice group being the smallest data granularity for storage processor access associated with the storage system; determining a correspondence between the size of the data information indicating area and the size of a slice group; and determining, based on the size of the data information indicating area and the correspondence, the size of the slice group.

In a second aspect of the present disclosure, provided is a device for managing a storage system. The device includes: at least one processing unit; at least one memory, coupled to the at least one processing unit and storing instructions executed by the at least one processing unit, the instructions, when executed by the at least one processing unit, causing the device to perform acts, including: determining the a of a data information indicating area in the storage system, the data information indicating area indicating content information related to a slice group including multiple slices, the slice group being the smallest data granularity for storage processor access associated with the storage system; determining a correspondence between the size of the data information indicating area and a size of the slice group; and determining, based on the size of the data information indicating area and the correspondence the size of the slice group.

In a third aspect of the present disclosure, provided is a computer program product. The computer program product is tangibly stored on a non-transient computer readable medium and includes machine executable instructions which, when being executed, causing the machine to perform any step of the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of example embodiments of the present disclosure with reference to the accompanying drawings, the above and other objects, features and advantages of the present disclosure will become more apparent, wherein the same reference numerals typically represent the same components in the example embodiments of the present disclosure.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Some preferable embodiments will be described in more detail with reference to the accompanying drawings, in which the preferable embodiments of the present disclosure have been illustrated. However, the present disclosure can be implemented in various manners, and thus should not be construed to be limited to embodiments disclosed herein. On the contrary, those embodiments are provided for the thorough and complete understanding of the present disclosure, and completely conveying the scope of the present disclosure to those skilled in the art.

The terms "comprise" and its variants used here are to be read as open terms that mean "include, but is not limited to." Unless otherwise specified, the term "or" is to be read as "and/or." The term "based on" is to be read as "based at least in part on". The terms "one example embodiment" and "one embodiment" are to be read as "at least one embodiment." The term "another embodiment" is to be read as "at least one other embodiment." The terms "first," "second" and the like may refer to different or the same objects. Other definitions, explicit and implicit, might be included below.

As described in the BACKGROUND, in implementations of current storage systems, the zerofilling bitmaps are managed and accessed at a very large granularity. Therefore, contention for a bitmap block will arise, and also cross-SP message communication for zerofilling bitmap synchronization will be caused. Further, the system performance will be degraded.

Figure 1:
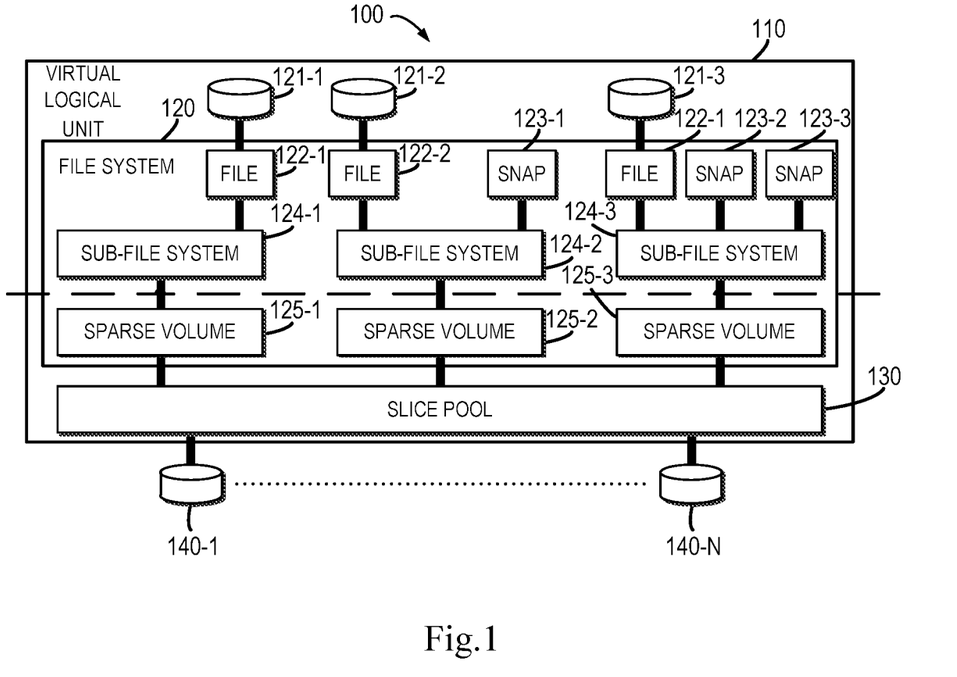
FIG. 1 shows a schematic view of a storage system 100 in a traditional solution.

FIG. 1 shows a schematic view of a storage system 100 in a traditional solution. The storage system 100 may be, for example, a storage device array. As shown in FIG. 1, the storage system 100 includes: a virtual logical unit 110; a file system 120; a slice pool 130; and cache volumes/LUN 140-1 to 140-N (collectively referred to as cache volumes/LUN140), wherein the cache volumes/LUN 140 constitutes the slice pool 130. The virtual logical unit 110 includes thin provisioning logical units 121-1, 121-2, and 121-3 (collectively referred to as thin provisioning logical units 121), wherein the virtual logical unit 110 exports the thin provisioning logical units 121 to users. In the traditional solution, the thin provisioning logical units 121 are more space-efficient than a traditional LUN. Specifically, a thin provisioning logical unit is built on top of the cache volume/LUN 140 and is implemented by two mappings.

On the one hand, the file system 120 includes sub-file systems 124-1, 124-2 and 124-3 (collectively referred to as sub-file systems 124) and sparse volumes 125-1, 125-2 and 125-3 (collectively referred to as sparse volumes 125), the sparse volumes 125 being concatenated into a logical address space. The sub-file systems 124 include files 122-1, 122-2 and 122-3 (collectively referred to as files 122) and snaps 123-1, 123-2 and 123-3 (collectively referred to as snaps 123), which constitute a mapping that implements the address space of the virtual logical unit 110. The file system 120 maintains the mapping from the thin provisioning logical units 121/file to the address space of the sparse volume. The allocation unit in the sub-file systems 124 is fixed in size, e.g. 8 KB.

On the other hand, the sparse volumes 125 maintain the mapping from its address space to the cache volume/LUN 140. The address space of the sparse volume may not be fully backed by the storage of the cache volume/LUN 140. Therefore, LUNs comprised in the slice pool 130 are carved into 256 megabytes (MB) slices which may be added into the sparse volumes 125 dynamically.

A zerofilling operation as described in the BACKGROUND will happen in the storage system 100. When a request for a zerofilling operation is received, depending on the size of zeroed range, the cache (or specialized circuitry that manages the cache) decides whether to really zero the FLU or just update the zerofilling bitmap in the following manner:

On the one hand, if the size of zeroed range is less than 1 MB, the cache will zero the range on the LUN directly; and On the other hand, otherwise, the cache just updates the zerofilling bitmap to indicate the range as zeroed rather than zeroing the range on the LUN, thus avoiding writing too many zeros to the LUN.

In the traditional solution, with the zerofilling bitmap introduced, both read and write operations are affected:

For a read operation, if the range to be read is covered by the zerofilling bitmap, the cache may possibly report zeros to the virtual logical unit 110/file system 120 directly depending on content of the zerofilling bitmap on the LUN; and For a write operation, if the range to be written is covered by the zerofilling bitmap, the cache may possibly need to clear the corresponding bits in the bitmap to indicate that the range is not zero any longer.

In current storage system implementations, the zerofilling bitmap is managed and accessed at a very large granularity: the smallest lockable bitmap block covers as much as 0.5 TB LUN disk range. Since IOs can come into the cache from multiple storage processors (two or more in the present disclosure), IOs falling into the same bitmap block covering range will inevitably contend for the bitmap block and cause cross-SP message communication for zerofilling bitmap synchronization, which will degrade the system performance.

Figure 2:
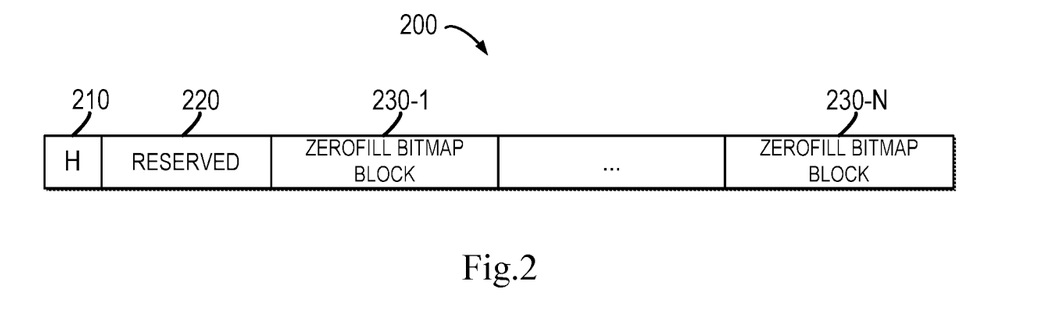
FIG. 2 shows a structural schematic view of a zerofilling bitmap 200 in a traditional solution.

FIG. 2 shows a schematic view of a structure of a zerofilling bitmap 200 in a traditional solution. The zerofilling bitmap 200 is a piece of continuous storage space located at the end of LUN. The Redundant Array of Independent Disks reserves the storage space in the storage system 100, and the cache maintains the zerofilling bitmap 200 in the storage space. The zerofilling bitmap 200 consists of a zerofilling bitmap header and some zerofilling bitmap blocks 230-1 to 230-N (collectively referred to as zerofilling blocks 230). Both the zerofilling bitmap header and the zerofilling bitmap blocks are 64 KB aligned and 64 KB in size. 64 KB is the size of a cache page data information indicating area (also referred to as CachePageReference). The purpose of keeping the zerofilling bitmap header 210 and the zerofilling bitmap blocks 64 KB aligned is to unify the management of data in the cache and data in the zerofilling bitmap 200. The zerofilling bitmap header 210 actually occupies only one sector, and the rest sectors are reserved for future usage, as indicated by numeral 220. Information in the zerofilling bitmap header 210 includes the version, state and starting offset (ZFBitmapOffset) of the zerofilling bitmap blocks 230, among which the starting offset may indicate a start position of the zerofilling bitmap block 230-1.

The minimum and maximum sized IOs the cache can handle are 1 sector and 4 MB respectively. And these IOs can start at any sector-aligned offset. Thus, it is natural for the cache to adopt a fixed-sized cache data management model.

A cache memory in each storage processor is usually divided into small fix-sized cache pages, e.g., 8 KB. The cache page stores a set of adjacent disk sectors and is the smallest management unit of the cache memory. The cache page data information indicating area (also referred to as cache page references, a data information indicating area or just references) tracks and controls all of the data in the cache pages. The data information indicating area associates cache pages with particular data on LUN (LUN/start LBA). The data information indicating area consists of at most 8 cache pages and therefore can describe 64 KB continuous data on LUN.

When an IO request comes into the cache, the cache uses the pair of values <LUN ID, start LBA> extracted from the IO request as the key to acquire access to the corresponding data information indicating area in the hash table. If these data information indicating areas do not exist, they will be created and added into the hash table. Once all the needed data information indicating areas are acquired, the cache can transfer user data to data information indicating areas' cache pages or load data from LUN to cache pages.

As described with reference to FIG. 2, both the zerofilling bitmap header 210 and the zerofilling bitmap blocks 230 are 64 KB aligned and 64 KB in size. Therefore, the cache can access the zerofilling bitmap 200 with the same data information indicating area model. The data information indicating areas tracking the zerofilling bitmap blocks 230 are referred to as zerofilling bitmap references or zerofilling data information indicating areas. In the traditional solution, a bit in the zerofilling bitmap 200 stands for 1 MB data in the LUN. If the bit is 1, it means the whole 1 MB data are all zeros. If the bit is 0, it means the whole 1 MB data are not zero. Since a zerofilling bitmap data information indicating area tracks a 64 KB zerofilling bitmap block 230 that can cover 0.5 TB data, the first zerofilling bitmap block 230-1 corresponds to the first 0.5 TB data on LUN and so on.

In the traditional solution, the cache is designed to provide the virtual logical unit 110/file system 120 with the capability of active/active access to LUNs. An active/active access model in nature requires a synchronization mechanism to serialize parallel access to the same piece of data. Cache pages with the same page number on two storage processors form a pair of mirrored pages. The pair of mirrored pages can store the same piece of data on LUN so that the data can be shared between two storage processors. But the data in mirrored pages cannot be modified simultaneously from two storage processors.

For cross-storage processor access control, a data information indicating area token mechanism is used. Each data information indicating area is initialized with one token. The data information indicating area with one token can only has shared access right to its pages. In order to obtain exclusive access right to the whole mirrored pages, the data information indicating area must request the token held by a peer data information indicating area which is tracking the same range of data from a peer storage processor. That is, a data information indicating area with two tokens can have full control on the mirrored pages. A data information indicating area without a token cannot access its pages.

Although a cross-storage processor token message is the necessary cost that the active/active access mode must pay, the 64 KB zerofilling bitmap blocks 230 which cover as much as 0.5 TB storage space have caused frequent cross-storage processor token messages and become a bottleneck of system performance. For example, if writes are issued to the same 0.5 TB-aligned 0.5 TB range and the corresponding zerofilling bitmap block 230 needs to updated due to the range is zeroed, the tokens of zerofilling bitmap data information indicating areas have to be transferred back and forth between two storage processors. Actually, not only writes, all other IO operations, (e.g. read, zerofilling, datamove and disparatewrite etc.) need to firstly access the zerofilling bitmap to determine if the target range is zeroed or not. If the tokens of the corresponding zerofilling bitmap data information indicating area are being used by a peer storage processor, these operations have to ask for at least one token from the peer and block until the tokens come back. This degrades the system performance.

In view of the traditional solution, the present disclosure performs problem finding with actual result (AR) finding technique. The obtained problem finding instance reveals such a problem which causes slow IOs and finally leads to single storage processor panic.

Table 1 below shows status of pending virtual logical unit 110/file system 120 IOs in a cache.

TABLE 1

XXXXXXXX: [[MRQE/SYS][Extreme][OB-D1368]] safe_dump found on spa
317 CacheRequests, 1912 pages held.
Read and Write stats (unit of time: ms):

| GroupType | GroupID | ReadCount | MinTime | MaxTime | AvgTime | EstIOPS | WriteCount | MinTime | MaxTime | AvgTime | EstIOPS |
|---|---|---|---|---|---|---|---|---|---|---|---|
| ... | | | | | | | | | | | |
| DPG | 98304 | 13 | 0 | 1600 | 207 | 8 | 163 | 0 | 1660 | 910 | 100 |
| ... | | | | | | | | | | | |

The oldest requests:
Read: 7f8403bb07e8 FLU-RG-DPG 2-2-98304 Time 1600 ms RAID5 4 + 1
Write: 7f84043e7ec0 FLU-RG-DPG 2-2-98304 Time 1660 ms RAID5 4 + 1

As seen from Table 1, the average response time (AvgTime on the right) of write is 0.9 s and the maximum (MaxTime on the right) is 1.66 s. Note that a user IO can be decomposed into many sub-IOs by the virtual logical unit 110/file system 120 and these sub-IOs will be sent to the cacheMCC in some kind of order. For write sub-IOs, since the average response time is 0.9 s, the accumulative result is the user IO becomes very slow.

Further analysis shows that 192 virtual logical unit 110/file system 120 IOs are blocked waiting for the same zerofilling bitmap data information indicating area 0x7f83f5a93750. The zerofilling bitmap data information indicating area is being exclusively held by a peer storage processor. With reference to Table 2 below, the table is an example of write waiting for the zerofilling bitmap 200. Using one write 0x7f84042b6ec0 as the example: the write is trying to acquire a zerofilling bitmap data information indicating area, but the data information indicating area has no tokens (mTokensHeld: 0) and thus has to ask two tokens (mTokensRequestedFromPeer: 2) from the peer storage processor. The zerofilling bitmap data information indicating area was just controlled by a local oldest request (mLastGrantedTo 0x7f84043e7ec0) and then the tokens were given to the peer to avoid starving IOs on the peer. But other local IOs want the tokens again and have to wait. The actual result shows the cross-storage processor zerofilling bitmap data information indicating area contention.

TABLE 2

| | |
|---|---|
| (CacheRequest*) | 0x7f84042b6ec0 |
| mIrp | : 0x7f7ef622c5e8 |
| Elapsed Time (ms) | : 1592 |
| Operation Type | : MJ_WRITE |
| States | : WriteActorStartOrRetryWrite CommonAccessAcquireRetry |
| mVolume | : 0x7f818a5ba100 |
| Starting Lba | : 0x1e8a78a40 |
| OffsetInTransfer | : 0x2000 |
| sectorsToTransfer | : 0x10 |
| ... | |
| Is Zero | : Yes |
| Waiting for access cref 0x7f83f5a93750 *ZeroFillBitmap* Access | |
| VolIdx 40, Lba 0x6c47f1580, SnapSeq 0 uVk 0x:9cce5e5a329daf83 | |
| ... | |
| mBusy | : YES |
| mGranting | : NO |
| mBusyReason | : PeerSyncingOrSendingTokens |
| mTokensHeld | : 0 |
| mTokensGrantedOrSending | : 0 |
| mTokensRequestedFromPeer | : 2 |
| mTokensToRequest | : 0 |
| mLastGrantedTo | : 0x7f84043e7f10 (creq 0x7f84043e7ec0) |

The storage system 100 and the zerofilling bitmap 200 in the traditional solution have been described with reference to FIGS. 1 and 2. In order to at least partly solve the above problems in the traditional solution, embodiments of the present disclosure propose a method for eliminating cross-storage processor access collision in the zerofilling bitmap 200. The method can improve the system performance, because IO operations accessing the zerofilling bitmap 200 do not have to execute cross-storage processor message communication.

Figure 3:
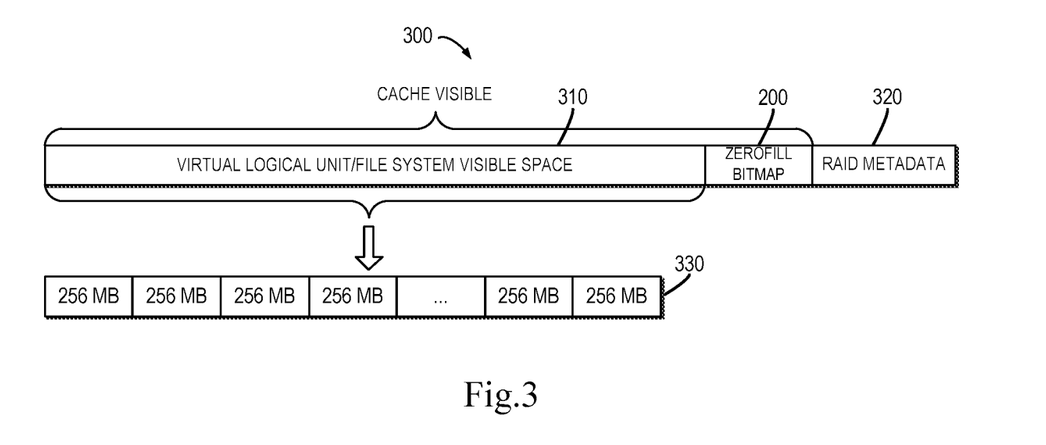
FIG. 3 shows a schematic diagram of different views 300 of a RAID virtual logical unit number according to embodiments of the present disclosure.
Figure 5:
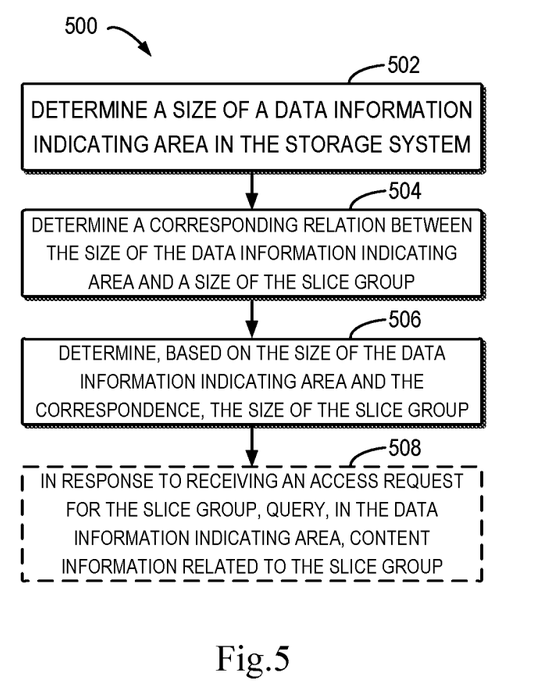
FIG. 5 shows a flowchart of a method 500 for managing a storage system according to an embodiment of the present disclosure.

With reference to FIGS. 3 to 5, detailed description is presented below to the specific flow and operations of a method 500 for managing a storage system according to embodiments of the present disclosure. FIG. 3 shows a schematic diagram of different views 300 of a RAID virtual logical unit. As described above, LUNs being exported to users are thin provisioning logical units which are built on top of traditional LUNs. The virtual logical unit 110 carves LUNs into 256 MB slices which are also referred to as virtual logical unit slices 330, and thin provisioning logical unit storage space is backed by these slices. Therefore, only a virtual logical unit/file system visible space 310 can be seen from the virtual logical unit slices 330. In addition, one slice can only be added into one thin provisioning logical unit, and one thin provisioning logical unit can only be owned by one storage processor. IOs to a thin provisioning logical unit from non-owner storage processor need to be redirected to the owner SP. Therefore, although the storage device array is active/active to users, from the cache's perspective, IO patterns from the virtual logical unit 110/file system 120 are active/passive as far as the granularity of slice is concerned, because the cache can see the virtual logical unit/file system visible space 310 and content of the zerofilling bitmap 200. That is, IOs targeted to a slice will not come into the cache from two storage processors simultaneously.

In embodiments of the present disclosure, the basic idea is based on the above observation of active/passive characteristics of slice IOs of the virtual logical unit 110/file system 120. This means IOs destined to a slice will only come into the cache from one storage processor. Accordingly, access to the piece of zerofilling bitmap corresponding to the slice is also from the same storage processor. If the slices and zerofilling bitmap are managed in a well-designed way, cross-storage processor contention can be eliminated completely. In order to achieve this purpose, in embodiments of the present disclosure, variable-sized data information indicating areas are introduced for the zerofilling bitmap, and slice groups (also referred to as slice allocation groups (SAGs)) are introduced for thin provisioning logical unit slice management. These contents may work together to avoid cross-storage processor zerofilling bitmap collision.

Figure 4:
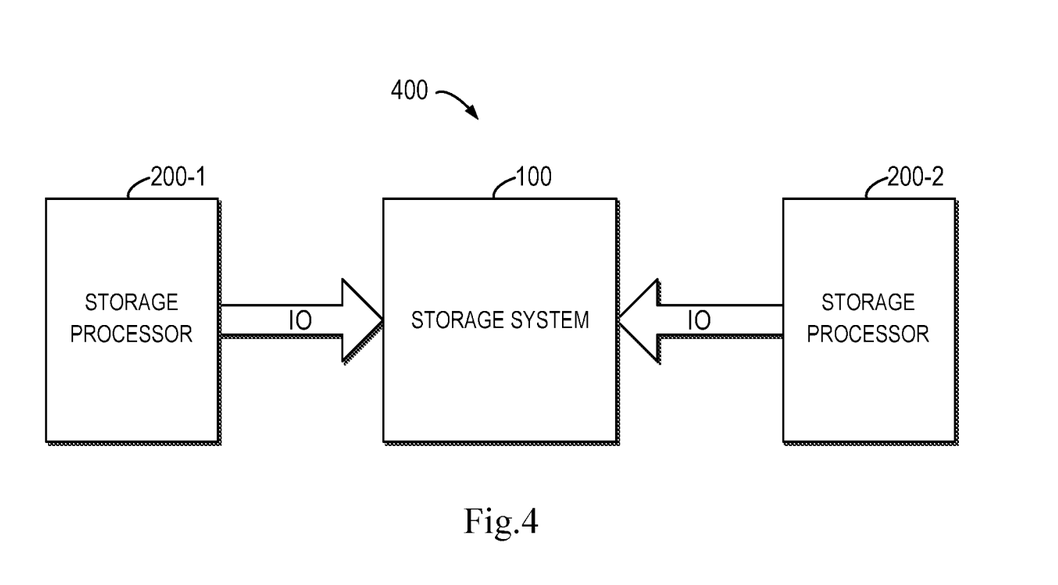
FIG. 4 shows a schematic view of an application environment 400 according to an embodiment of the present disclosure.

FIG. 4 shows a schematic view of an application environment 400 according to embodiments of the present disclosure. As depicted, the application environment 400 includes a storage system 100 and storage processors 410-1 and 410-2 (collectively referred to as storage processors 410). The storage processors 410-1 and 410-2 share the storage system 100 and may issue IO requests to the storage system 100. It should be understood embodiments of the present disclosure are not intended to limit the application environment 400 includes only two storage processors 410, but the application environment 400 may include more than two storage processors 410. Therefore, the number of the storage processors 410-1 and 410-2 as mentioned in embodiments is merely for the illustration purpose, rather than limiting the present disclosure.

FIG. 5 shows a flowchart of a method 500 for managing a storage system according to embodiments of the present disclosure. Specifically, FIG. 5 may be implemented in the application environment 400 shown in FIG. 4 and may be executed by the storage system 100 or other appropriate device. It should be understood the method 500 may further include an additional step that is not shown and/or may omit a step that is shown, and the scope of the present disclosure is not limited in this regard.

At block 502, the storage system 100 determines the size of a data information indicating area in the storage system 100. According to embodiments of the present disclosure, the data information indicating area may indicate content information related to a slice group including multiple slices. According to one embodiment of the present disclosure, the data information indicating area may indicate a zerofilling status of a corresponding slice group. According to other embodiment of the present disclosure, the data information indicating area may further be defined to indicate any other content information of the corresponding slice group, e.g. whether the corresponding slice group has been read or written, the number of reads or writes thereto, the property of stored data, etc. Meanwhile, according to embodiments of the present disclosure, the slice group may be defined as the smallest data granularity which storage processors associated with the storage system 100 can access. Detailed illustration is presented below to the size of the data information indicating area and defining the slice group as the smallest data granularity.

With respect to the size of the data information indicating area, as described above, the cache in the traditional solution uses a fixed-sized data information indicating area model: data information indicating areas tracking both data and zerofilling bitmap blocks are 64 KB in size. The data information indicating area consists of eight cache pages whose size is 8 KB. The data information indicating area tracks the status of data in cache pages at the granularity of sector:

Invalid (I): The sector is invalid;
Valid (V): The sector is valid on this storage processor;
Dirty (D): The sector is dirty on both storage processors;
Prepared (P): For a read, it indicates that the sector has no data. For a write, it indicates that the sector contains data needed for commit.

64 KB is a proper size for managing data blocks, but too large for zerofilling bitmap blocks 230 which is the source of zerofilling bitmap contention. Suppose that one bit in the zerofilling bitmap can represent "N" bytes of data being zeroed or not. Then the amount of data which a 64 KB zerofilling bitmap data information indicating area can represent is equal to 64×1024×8×N bytes. In the current cache implementation, N is 1024 bytes. So a zerofilling bitmap data information indicating area can represent totally 0.5 TB of data.

According to embodiments of the present disclosure, in order to still leverage the cache's data information indicating area model to manage the zerofilling bitmap 200, the size of a data information indicating area is determined depending on the type of the data information indicating area, i.e. it is defined the data information indicating area is size variable.

For a slice data information indicating area, its size is still 64 KB;

For a zerofilling bitmap block data information indicating area, its size can be one or multiple sectors.

Suppose the size of a zerofilling bitmap data information indicating area is "M" sectors. Then the amount of data which one zerofilling bitmap 200 can represent is M×512×8×N. The size of the zerofilling bitmap data information indicating area must be the multiple of sectors because the smallest manageable data status in the storage system 100 is per sector.

By allowing a smaller data information indicating area size for the zerofilling bitmap 200, the amount of data covered by the zerofilling bitmap 200 will be reduced correspondingly. For example, when M is 1, a zerofilling bitmap data information indicating area only covers 4 GB data. Compared with the 64 KB zerofilling bitmap data information indicating area covering 0.5 TB data, this can greatly reduce the access collision of a zerofilling bitmap data information indicating area between two storage processors.

Using smaller zerofilling bitmap data information indicating areas will consume a little more data information indicating area resources as compared to the traditional solution. For example, for 10 TB LUN, the maximum numbers of zerofilling bitmap data information indicating areas both the traditional solution implementation and the method according to embodiments of the present disclosure need are 20 and 2560 respectively, given that zerofilling bitmap data information indicating area size is one sector. Considering that this is the worst case and the cache size is usually tens of GBs, the additional data information indicating area overhead is actually trivial and still acceptable.

As described above, reducing the size of zerofilling bitmap data information indicating areas can relieve the cross-storage processor access collision of the zerofilling bitmap 200 and greatly improve the performance.

According to embodiments of the present disclosure, in order to further reduce the cross-storage processor access collision of the zerofilling bitmap 200 and eliminate the collision completely, the concept of slice group (also referred to as Slice Allocation Group (SAG)) is introduced: A group of continuous slices forms a slice group; All the slices in a slice group must be allocated and released atomically, which means the slice group will be the basic allocation unit of thin provisioning logical unit storage space; The number of slices in a slice group is fixed and depends on the size of zerofilling bitmap data information indicating areas.

Suppose that "SliceGroup$_{Num}$" stands for the number of slices in a slice group, "S" is the size of A single slice (unit: MB), the size of zerofilling bitmap data information indicating areas is "M" sectors, and one bit in the zerofilling bitmap data information indicating area can represent "N" bytes of data, then a formula may be derived as below:

$$\text{SliceGroup}_{Num}=M*512*8*(N/1024)/S$$

According to embodiments of the present disclosure, M is one sector, N is 1024 bytes and S is 256 MB. Then SliceGroupNum is 16. That is, a slice group consists of 16 slices.

According to embodiments of the present disclosure, when adding and removing slices from thin provisioning logical units, slices belonging to the same slice group will be handled atomically. Thus it can be ensured IOs destined to a slice group will not come into the cache from two storage processors simultaneously. By aligning the size of slice group with the size of zerofilling bitmap data information indicating area (as depicted in above formula), IOs destined to different slice groups will never contend for the same zerofilling bitmap data information indicating area. Therefore, cross-storage processor zerofilling bitmap contention can be eliminated completely.

As described above, the operation depicted at block 502 covers determining the size of the data information indicating area and defining the slice group as the smallest data granularity. Since the size of the zerofilling bitmap data information indicating area may be one or more sectors, the storage system 100 determining the size of the data information indicating area in the storage system may include the storage system 100 determining the size of the data information indicating area in the storage system 100 as one or more sectors. According to embodiments of the present disclosure, the size of the data information indicating area may be determined according to actual demands, wherein the smaller the size of the data information indicating area, the smaller the size of a corresponding slice group, and wherein the smallest size of the data information indicating area is one sector.

At block 504, the storage system 100 determines a correspondence between the size of the data information indicating area and the size of the slice group. As described, one bit in the data information indicating area may represent 1024 bytes of data, at which point the correspondence between the size of the data information indicating area and the size of the slice group is one bit to 1024 bytes. It should be understood the correspondence may be defined according to actual condition of the system and needed data, and thus a specific value is not intended to limit the scope of the present disclosure.

At block 506, the storage system 100 determines, based on the size of the data information indicating area and the correspondence, the size of the slice group. As described above, both the size of the data information indicating area and the correspondence may be customized, the size of the slice group may also be customized.

At block 508, in response to receiving an access request for the slice group, the storage system 100 looks up the content information related to the slice group in the data information indicating area. According to embodiments of the present disclosure, block 508 is an optional operation in FIG. 5 and hence is shown with dashed lines. It should be understood operations recorded at blocks 502 to 506 do not have to be triggered by receiving an access request. Therefore, block 508 actually describes how to operate according to the access request after the storage system 100 determines the size of the data information indicating area, the correspondence and the size of the slice group.

With reference to FIG. 5, the flow of the method 500 for managing a storage system has been described from the perspective of the storage system 100. It should be understood the description from the perspective of the storage system 100 is to better present content disclosed in the present disclosure, rather than limiting in any manner.

With the method 500 for managing a storage system according to embodiments of the present disclosure, the management of tokens of zerofilling bitmap data information indicating areas can be effected easily.

As described above, in the traditional solution, since the same zerofilling bitmap block can be accessed concurrently, the tokens of the zerofilling bitmap data information indicating areas have to stay in two storage processors in rotation to avoid starving any storage processor. Naturally, often arises such a circumstance in which one storage processor must request tokens from anther storage processor.

With the method 500 for managing a storage system according to embodiments of the present disclosure, as a data information indicating area, when the zerofilling bitmap data information indicating area is updated, its content should also be mirrored to a peer storage processor that uses the zerofilling bitmap 200. When mirroring the data, the zerofilling bitmap data information indicating area should send all its tokens to the peer storage processor so that a peer data information indicating area on the peer storage processor can have full control to update the data with the received data.

With the method 500 for managing a storage system according to embodiments of the present disclosure, acquiring and updating a zerofilling bitmap block on the storage processor implies that the corresponding slice group is owned by this storage processor and the peer storage processor will never have the need of acquiring this specific zerofilling bitmap data information indicating area on its own initiative. So this storage processor should carry a hint in the mirror message to ask the peer storage processor to return all the tokens of the zerofilling bitmap data information indicating area immediately once the data have been mirrored. Therefore, when this storage processor needs to acquire the zerofilling bitmap data information indicating area, it always has two tokens and does not need to send an additional message to request tokens from the peer.

With the method 500 for managing a storage system according to embodiments of the present disclosure, thin provisioning logical unit trespassing may also be supported easily.

The ownership of a thin provisioning logical uni can be transferred from one storage processor to another. This is called "LUN trespassing." Suppose that a thin provisioning logical unit is trespassed from a first storage processor to a second storage processor. We do not need to take additional actions on zerofilling bitmap data information indicating area tokens. The token transfer will be done in a lazy and gradual mode. Since the thin provisioning logical unit has been trespassed to the second storage processor, no IOs will be issued to the thin provisioning logical unit from the first storage processor. As IOs are issued to the thin provisioning logical unit from the second storage processor, the second storage processor finds it has no tokens for the zerofilling bitmap data information indicating area, it will request tokens from the first storage processor. But this only occurs one time when the second storage processor accesses the data information indicating area for the first time. After that, the tokens of the zerofilling bitmap data information indicating area will stay on the second storage processor all the time.

The specific flow and operations of the method 500 for managing a storage system according to embodiments of the present disclosure have been described with reference to FIGS. 3 to 5. Now a comparison between the method 500 for managing a storage system according to embodiments of the present disclosure and the traditional solution is illustrated with reference to FIGS. 6 and 7.

Figure 6:
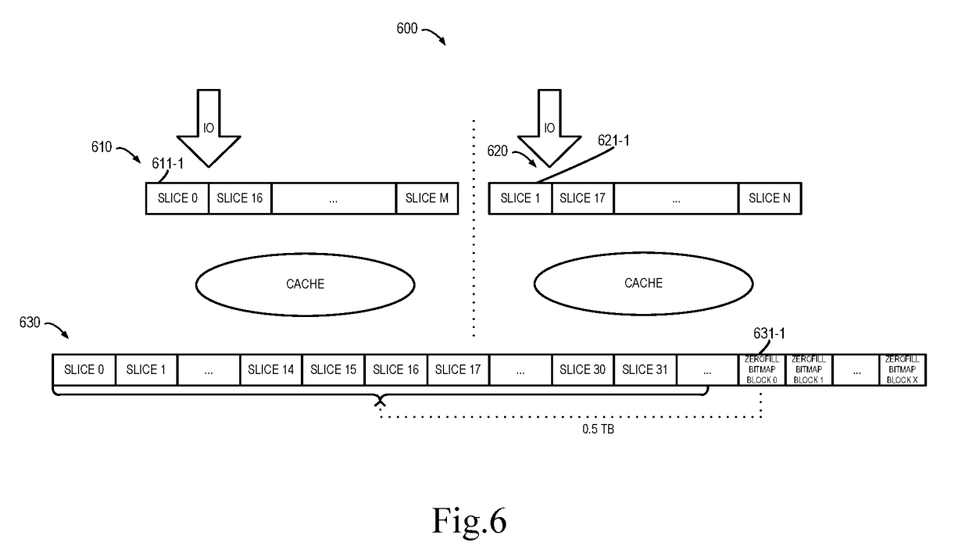
FIG. 6 shows a schematic view of an example 600 of cross-storage processor zerofilling bitmap collision in a traditional solution.

FIG. 6 shows a schematic view of an example 600 of cross-storage processor zerofilling bitmap collision in the traditional solution.

As depicted, the zerofilling bitmap 200 is managed with 64 KB data information indicating areas. zerofilling bitmap block 0 is the first zerofilling bitmap block (64 KB) which covers the first 0.5 TB LUN data space. The size of each slice is 256 MB. So a zerofilling bitmap data information indicating area covers a total of 2048 slices. The slice is the smallest allocation unit for thin provisioning logical unit. Slice 0 is mapped to the first thin provisioning logical unit which is owned by the first storage processor, and slice 1 is mapped to the second thin provisioning logical unit which is owned by the second storage processor. zerofilling bitmap block 0 has been written as "1" per bit, which indicates that all the data in the first 0.5 TB are zeros. One bit in the zerofilling bitmap 200 covers 1 MB data: "1" indicates the 1 MB data are all zeros and "0" indicates the 1 MB data are non-zeros.

Suppose that a 64 KB write is issued to slice 0 from the first storage processor. The cache may handle the write. First of all, the cache tries to acquire the exclusive access right to zerofilling bitmap block 0. If the zerofilling bitmap block 0 data information indicating area has no enough tokens (two tokens), a token request message needs to be sent to the second storage processor. Then, the cache checks the zerofilling bitmap block to see if the write destination range is zeroed or not. If the corresponding bit is 0, it means the destination range is not zeroed; the zerofilling bitmap block 0 data information indicating area will be released since there is no need to update the zerofilling bitmap block. Otherwise, the corresponding bit in the zerofilling bitmap block 0 data information indicating area is changed from 1 to 0 to indicate the 1 MB data are not zero any more. Next, the cache tries to acquire the exclusive access right to the data information indicating area of the 64 KB write data and requests tokens from a peer if necessary. Subsequently, the 64 KB data are transferred from the host to the data information indicating area to the write destination range, and the rest of data in the 1 MB data are written to zero. Later, the data information indicating area to the 64 KB write data is committed by mirroring the data to the peer storage processor. The data information indicating area to the zerofilling bitmap block 0 data information indicating area is committed by mirroring the zerofilling bitmap data to the peer storage processor. The write operation is completed so far.

Therefore, writing to a zeroed range (slice 0) requires acquiring and modifying the corresponding zerofilling bitmap data information indicating area with exclusive access. This may incur a cross-storage processor token message if a local storage processor has no enough tokens for the data information indicating area. Suppose that another 64 KB write is issued to slice 1 from the first storage processor. This write also needs to acquire the zerofilling bitmap block 0 data information indicating area with exclusive access. It may need to request tokens from the second storage processor. Thus, when writes comes into the array from two storage processors in parallel as usual, two storage processors will contend for the same zerofilling bitmap block 0 data information indicating are.

Figure 7:
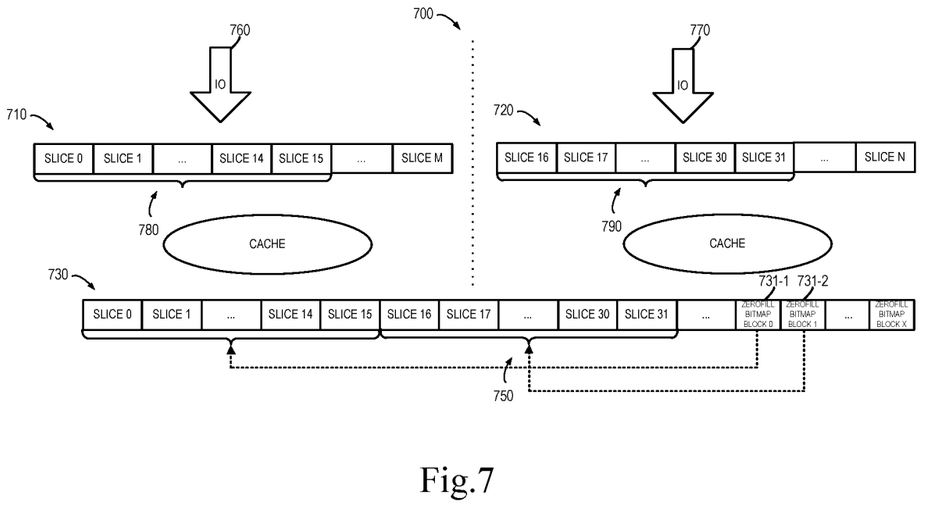
FIG. 7 shows a schematic view of an example 700 of avoiding cross-storage processor zerofilling bitmap collision according to an embodiment of the present disclosure.

FIG. 7 shows a schematic view of an example 700 of avoiding cross-storage processor zerofilling bitmap collision according to embodiments of the present disclosure.

As depicted, the zerofilling bitmap 200 is managed with one sector, the data information indicating area covering only 4 GB data. The size of the zerofilling bitmap data information indicating area is aligned to the size of the slice group. The slice group in a LUN 730 consists of 16 slices (16×256 MB=4 GB), wherein the slice group is the basic allocation unit for thin provisioning logical units. For example, a first slice group 740 is allocated to a first thin provisioning logical unit 710 on the first storage processor, and a second slice group 750 is allocated to a second thin provisioning logical unit 720 on the second storage processor. zerofilling bitmap block 0 (denoted by numeral 731-1 in FIG. 7) covers data of the first slice group 740, and zerofilling bitmap block 1 (denoted by numeral 731-2 in FIG. 7) covers data of the second slice group 750. IOs 760 destined to the first slice group 780 can only come from the first storage processor, and thus access to zerofilling bitmap block 0 is limited to the first storage processor. Similarly, IOs 770 destined to the second slice group 790 can only come from the second storage processor, and thus access to zerofilling bitmap block 1 is limited to the second storage processor. Therefore, zerofilling bitmap contention is eliminated completely.

As seen from the above description with reference to FIGS. 1 to 7, the technical solution according to embodiments of the present disclosure has many advantages over the traditional solution. First of all, according to embodiments of the present disclosure, for the cache, a variable-sized data information indicating area is allowed depending on the type of the data information indicating area. The size of zerofilling bitmap data information indicating area can be reduced to one sector at a minimum. This allows the zerofilling bitmap to be locked at the granularity of sector. In addition, for the virtual logical unit 110 layer, the size of slice group is aligned to that of zerofilling bitmap data information indicating area by defining the slice group as the smallest data granularity. Therefore, slice groups must be added/removed to/from thin provisioning logical units atomically. This ensures that IOs destined to a slice group will only come into the cache from one storage processor. Using the technical solution provided in embodiments of the present disclosure, cross-storage processor zerofilling bitmap access collision is eliminated completely. This not only saves potential cross-storage processor message communication from IO paths but also prevents the zerofilling bitmap 200 from becoming the bottleneck of system performance. The improvement is especially beneficial to workloads which cause frequent cross-storage processor contention for the zerofilling bitmap 200 as in the example of the above-mentioned actual result finding instance. The experiment results show that saving cross-storage processor messages in IO paths can increase IO performance of cache volumes by 8%~10%.

Figure 8:
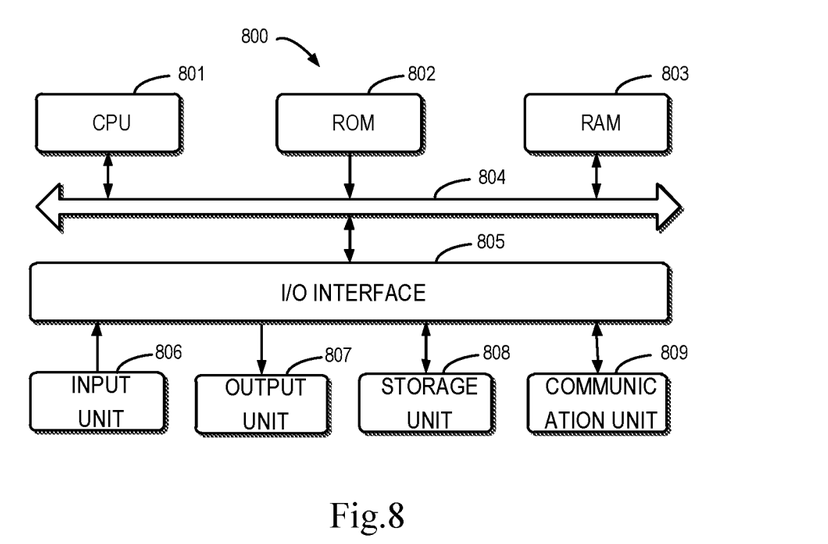
FIG. 8 shows a schematic block diagram of an example device 800 that is applicable to implement embodiments of the present disclosure.

FIG. 8 shows a schematic block diagram of an example device 800 that is applicable to implement embodiments of the present disclosure. As depicted, the device 800 includes a central processing unit (CPU) 801 which is capable of performing various appropriate actions and processes in accordance with computer program instructions stored in a read only memory (ROM) 802 or computer program instructions loaded from a storage unit 808 to a random access memory (RAM) 803. In the RAM 803, there are also stored various programs and data required by the device 800 when operating. The CPU 801, the ROM 802 and the RAM 803 are connected to one another via a bus 804. An input/output (I/O) interface 805 is also connected to the bus 804.

Multiple components in the device 800 are connected to the I/O interface 805, these components includes: an input unit 806, e.g., a keyboard, a mouse, or the like; an output unit 807, e.g., various types of displays, loudspeakers or the like; a storage unit 808, e.g., a disk, an optical disk, or the like; and a communication unit 809, e.g., a network card, a modem, a wireless communication transceiver, or the like. The communication unit 809 allows the device 800 to exchange information/data with other devices via a computer network, e.g., the Internet, and/or various telecommunication networks.

The above-described procedures and processes (e.g., the method 500) may be executed by the processing unit 801. For example, in some embodiments, the method 500 may be implemented as a computer software program, which is tangibly embodied on a machine readable medium, e.g. the storage unit 808. In some embodiments, part or the entirety of the computer program may be loaded to and/or installed on the device 800 via the ROM 802 and/or the communication unit 809. The computer program, when being loaded to the RAM 803 and executed by the CPU 801, may perform one or more actions of the method 500 as described above.

The present disclosure may be a method, a device, a system, and/or a computer program product. The computer program product may include a computer readable storage medium (or media) having computer readable program instructions thereon for carrying out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combinations of the foregoing. More specific examples of the computer readable storage medium (a non-exhaustive list) includes a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device (e.g., punch-cards or raised structures in a groove having instructions recorded thereon), and any suitable combinations of the foregoing. A computer readable storage medium, as used herein, is not to be construed as being transitory signals per se, e.g., radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or an external storage device via a network, e.g., the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storing in computer readable storage media in the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source codes or object codes written in any combination of one or more programming languages, including an object oriented programming language such as Java, Smalltalk, C++, or the like, and conventional procedural programming languages, such as the "C" language or similar programming languages. The computer readable program instructions may execute entirely on the user's computer, partly on the user's computer, as a stand-alone software package, partly on the user's computer and partly on a remote computer, or entirely on the remote computer or server. In the latter scenario related to the remote computer, the remote computer may be connected to the user's computer through any type of networks, including a local area network (LAN) or a wide area network (WAN), or the connection may be made to an external computer (for example, through the Internet using an Internet Service Provider). In some embodiments, electronic circuitry including, e.g., programmable logic circuitry, field-programmable gate arrays (FPGA), or programmable logic arrays (PLA) may execute the computer readable program instructions by utilizing state information of the computer readable program instructions to personalize the electronic circuitry, in order to carry out aspects of the present disclosure.

Aspects of the present disclosure are described herein with reference to flowcharts and/or block diagrams of methods, devices (systems), and computer program products according to embodiments of the invention. It should be understood that each block of the flowcharts and/or block diagrams, and combinations of blocks in the flowcharts and/or block diagrams, can be implemented by computer readable program instructions.

These computer readable program instructions may be provided to a processor of a general purpose computer, special purpose computer, or other programmable data processing apparatuses to produce a machine, such that the instructions, when executing via the processor of the computer or other programmable data processing apparatus, create means (e.g., specialized circuitry) for implementing the functions/acts specified in the flowchart and/or block diagram block or blocks. These computer readable program instructions may also be stored in a computer readable storage medium, such these instructions can direct a computer, a programmable data processing apparatus, and/or other devices to function in a particular manner, such that the computer readable storage medium having instructions stored therein includes an article of manufacture including instructions that carry out aspects of the function/act specified in the flowchart and/or block diagram block or blocks.

The computer readable program instructions may also be loaded onto a computer, other programmable data processing apparatuses, or other devices to cause a series of operational steps to be performed on the computer, other programmable data processing apparatuses, or other devices to produce a computer implemented process, such that the instructions which execute on the computer, other programmable data processing apparatuses, or other devices carry out the functions/acts specified in the flowchart and/or block diagram block or blocks.

The flowcharts and block diagrams in the figures illustrate the architectures, functionalities, and operations of possible implementations of systems, methods, and computer program products according to various embodiments of the present disclosure. In this regard, each block in the flowcharts or block diagrams may represent a module, a segment of program, or portion of codes, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform specified functions or acts, or can be implemented by combinations of special purpose hardware and computer instructions.

The descriptions of the various embodiments of the present disclosure have been presented for purposes of illustration, but are not intended to be exhaustive or limited to embodiments disclosed. Many modifications and variations will be apparent to those of ordinary skill in the art without departing from the scope and spirit of the described embodiments. The terminology used herein was chosen to best explain the principles of embodiments, the practical application or technical improvement over technologies found in the marketplace, or to enable others of ordinary skill in the art to understand embodiments disclosed herein.

We claim:

1. A method for managing a storage system having a first storage processor and a second storage processor, comprising:

determining a size of a data information indicating area in the storage system, the data information indicating area indicating content information related to a slice group including multiple slices of uniform size, a slice being a smallest data granularity that a storage processor may provision to a LUN (Logical Unit) associated with the storage system, wherein data information indicating areas have different sizes for different slice groups;

calculating, based on the size of the data information indicating area and a predetermined correspondence relationship, a size of the slice group; and in response to the first storage processor receiving a write request to write a portion of the slice group, (i) obtaining a lock on the data information indicating area and (ii) executing the write without contention from the second storage processor for the data information indicating area.

2. The method according to claim 1, wherein determining a size of a data information indicating area in the storage system comprises:

determining the size of the data information indicating area as a size of one or more sectors.

3. The method according to claim 1, wherein the content information indicates a zero-filling status of data in the slice group.

4. A device for managing a storage system, comprising a first storage processor and a second storage processor, each of the first storage processor and the second storage processor including:

at least one processing unit; and at least one memory coupled to the at least one processing unit and storing instructions to be executed by the at least one processing unit, the instructions, when being executed by the at least one processing unit, causing the device to perform acts comprising:

determining a size of a data information indicating area in the storage system, the data information indicating area indicating content information related to a slice group including multiple slices of uniform size, a slice being the smallest data granularity that a storage processor may provision to a LUN (Logical Unit) for storage processor access associated with the storage system, wherein data information indicating areas have different sizes for different slice groups;

calculating, based on the size of the data information indicating area and a predetermined correspondence relationship, a size of the slice group; and in response to the first storage processor receiving a write request to write a portion of the slice group, (i) obtaining a lock on the data information indicating area and (ii) executing the write without contention from the second storage processor for the data information indicating area.

5. The device according to claim 4, determining a size of a data information indicating area in the storage system comprises:

determining the size of the data information indicating area as a size of one or more sectors.

6. The device according to claim 4, wherein the content information indicates a zero-filling status of data in the slice group.

7. A computer program product having a non-transitory computer readable medium which stores a set of instructions to manage a storage system having a first storage processor and a second storage processor; the set of instructions, when carried out by computerized circuitry of the storage system, causing the computerized circuitry to perform a method of:

determining a size of a data information indicating area in the storage system, the data information indicating area indicating content information related to a slice group including multiple slices of uniform size, a slice being a smallest data granularity that a storage processor may provision to a LUN (Logical Unit) associated with the storage system, wherein data information indicating areas have different sizes for different slice groups;

calculating, based on the size of the data information indicating area and a predetermined correspondence relationship, a size of the slice group; and in response to the first storage processor receiving a write request to write a portion of the slice group, (i) obtaining a lock on the data information indicating area and (ii) executing the write without contention from the second storage processor for the data information indicating area.

8. The computer program product of claim 7 wherein the first storage processor of the storage system operates in parallel to the second storage processor of the storage system for load balancing input/output (IO) operations on behalf of a set of host computers; and wherein the method further comprises:

performing, by the first storage processor, a zerofilling bitmap access operation to update a zerofilling bitmap which supports variable-sized data information indicating areas, the zerofilling bitmap access operation updating the zerofilling bitmap with eliminated cross-storage processor contention.

9. The method of claim 3, and wherein calculating the size of the slice group includes assigning a number of bytes of data represented by each bit of the data information indicating area.

10. The method of claim 3, further comprising, in response to the first storage processor receiving a read request to read a second portion of the slice group, returning all zeroes in response to the read request based on the data information indicating area indicating that the second portion of the slice group is all zeroes.

11. The method of claim 1, wherein the first storage processor is an exclusive owner of the portion of the slice group, and wherein acquiring the lock is performed by the first storage processor without communicating the lock to the second storage processor.

* * * * *